E. WILSON.
METALLIC PACKING.
APPLICATION FILED MAR. 12, 1920.

1,415,078.

Patented May 9, 1922.

Attest.
Charles A. Becker.

Inventor:
Edward Wilson,
by Rippey & Kingsland,
his Attorneys.

UNITED STATES PATENT OFFICE.

EDWARD WILSON, OF ST. LOUIS, MISSOURI, ASSIGNOR TO WILSON ENGINEERING COMPANY, OF ST. LOUIS, MISSOURI, A CORPORATION OF MISSOURI.

METALLIC PACKING.

1,415,078.   Specification of Letters Patent.   Patented May 9, 1922.

Application filed March 12, 1920. Serial No. 365,167.

*To all whom it may concern:*

Be it known that I, EDWARD WILSON, a citizen of the United States, residing at St. Louis, Missouri, have invented new and useful Improvements in Metallic Packings, of which the following is a specification.

This invention relates to a metallic packing.

My invention comprises a metallic packing which is specially designed and constructed for efficient use in connection with the shafts of rotary compressors, or upon any rotary shaft or valve stem, and is particularly useful as a packing in connection with shafts or stems which are subjected to high pressures.

An object of the invention is to provide an improved metallic packing for the uses mentioned which is so constructed that when assembled all need for adjustment is eliminated, the final assembling of the packing being made in accordance with a predetermined design or plan so that the parts cannot be assembled out of their proper adjustment.

Another object of the invention is to provide a metallic packing of the character mentioned which minimizes friction in the operation of the shaft or stem upon which the packing is mounted.

Another object of the invention is to provide an improved metallic packing which, while minimizing the friction in the operation of the shaft or stem in connection with which the packing is mounted, also prevents leakage through or around the packing even when used under high pressure.

Another object of the invention is to provide a packing which is sealed against leakage by action of the pressure of gas tending to cause leakage, and to provide a large extent of bearing surface in the form of thrust collars to carry the load created by this pressure so as to reduce the load per square inch upon the sliding surfaces to prevent heating and rapid wear.

Another object is to eliminate all wear of the shaft proper which under old methods, often has to be returned to a smooth surface, thereby weakening the shaft and ultimately necessitating replacement.

My invention is also designed to accomplish various other improved results, and is intended for all uses to which it may be satisfactorily applied, and I do not restrict myself in these or any other particulars except as required by the appended claims.

With the foregoing and other objects in view, I have shown one embodiment of my invention in the drawings, in which—

Figure 1:
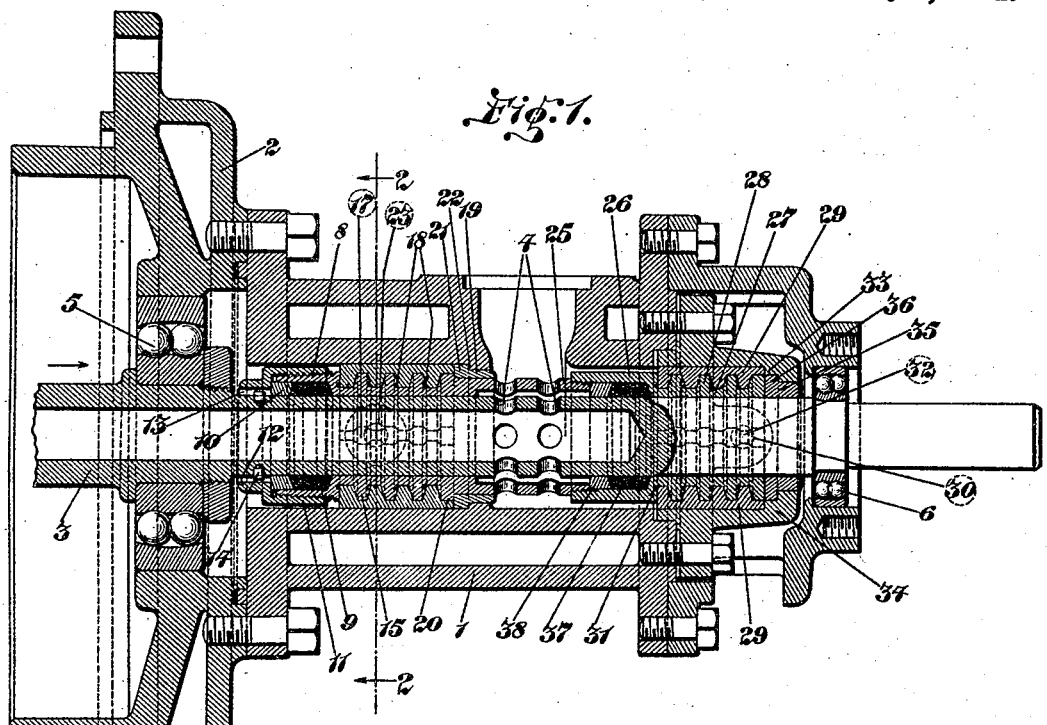
Fig. 1 is a longitudinal sectional view of my improved packing shown mounted in connection with part of a refrigerating machine.

In the embodiment shown the stuffing box 1 of the packing is supported by the casing 2 of a refrigerating machine. The shaft 3 is hollow for a portion of its length and has openings 4 for the passage of pressure or for the passage of refrigerant in the creation of a vacuum. When a vacuum is created in the chambers leading to the openings 4 there is a tendency for air to enter past the seal at collar 35 hereinafter described, but the preponderance of pressure acting outwardly from the compressor chamber (about 185 pounds per square inch in an ammonia machine) against the cross sectional area of the packing, holds the seal at collar 35 and collar 20 tight against atmospheric pressure acting from outside.

The casing 2 of the machine supports a ball bearing device 5 in which the shaft is journaled and the stuffing box supports a ball bearing device 6 for the outer portion of the shaft which relieves the packing from lateral pressure and strains, thus greatly minimizing the friction which would otherwise result and also permitting more perfect operation.

As shown the packing comprises a sleeve 7 encircling the shaft and having a cylindrical threaded portion 8 at its inner end enclosing a quantity of Garlock or other appropriate packing material 9. A gland 10 pressed within the cylindrical portion 8 by a sleeve nut 11 compresses the packing 9 as required to form a perfect seal and prevent leakage through the packing, even under conditions of high pressure. The sleeve nut 11 is formed with a reduced portion 12 grooved or channeled as shown at 13 to receive pins or keys 14 whereby the packing is turned with the shaft. It is proper that the sleeve nut 11 be threaded on the sleeve member 7 in a direction opposite to the direction in which the shaft rotates so that the sleeve nut 11 will remain tight, and be tightened rather than loosened during the rotation of the shaft.

The sleeve 7 is formed with a number of circumferential ribs or flanges 15 which have relatively wide peripheral surfaces and inclined side walls when viewed in section as in Fig. 1. The portion of the sleeve member 7 on which the flanges 15 are formed, is mounted within a lining having internal grooves receiving the flanges 15, said lining comprising a pair of members 16 abutting along one edge thereof and spaced apart at their opposite edges, leaving a space into which a quantity of felt 17 or other appropriate material is packed and compressed. The packing material 17 serves as a capillary conductor or conveyor for lubricant to conduct or convey lubricant between the sleeve member 7 and the lining. Preferably circumferential grooves 18 are formed at the bases and on the thrust side of the flanges 15 to receive the lubricant conducted or conveyed thereto through the packing 17. In addition, the packing 17 acts as a wiper to lubricate the thrust collar at the end of the lining 16.

As shown a thrust collar 19, comprising a solid ring encircling the sleeve 7, abuts against a circumferential shoulder 20 on said sleeve and has a circumferential flange 21 abutting against a shoulder 22 in the stuffing box, and forming an abutment for the end of the lining 16. The collar 19 is pressed into the member 1. By this construction the thrust collar 19 is made to serve the function of a thrust member for the sleeve 7 and the lining 16. Lubricant may be supplied to the packing 17 through a passage 23. As shown, the lining, comprising the members 16, is held from rotation by a pin or key 24 engaging said members 16 and the stuffing box.

Figure 2:
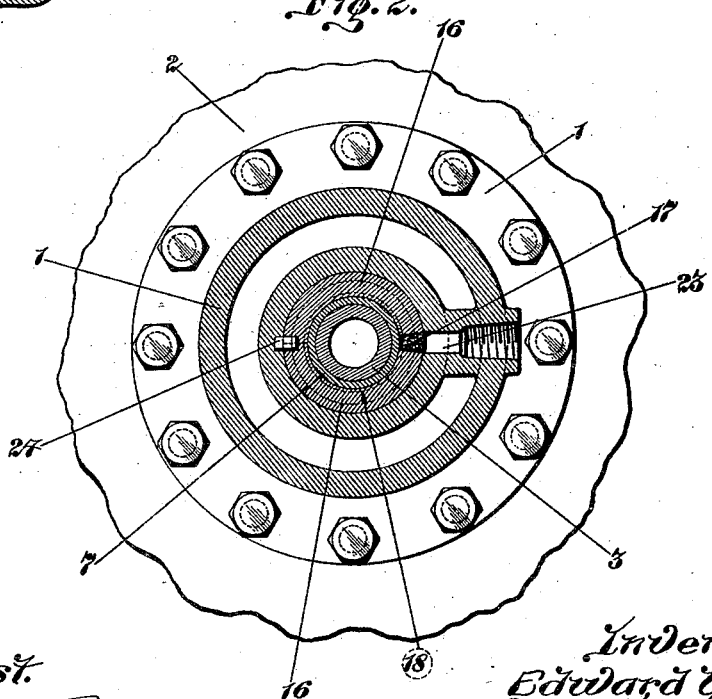
Fig. 2 is a cross sectional view on the line 2—2 of Fig. 1.

In the construction shown the outer end of the sleeve 7 is provided with external threads terminating at an abutment shoulder 25; and a sleeve member is threaded on the threaded portion and abuts against the shoulder 25. The last-mentioned sleeve member comprises a cylindrical portion 26 which is interiorly threaded and which is screwed onto the threaded portion of the sleeve 7 into abutting contact with the shoulder 25 which serves as a stop or abutment to limit extent to which the sleeve members may be threaded one upon the other, and to serve as a thrust for transmitting a part of the thrust load to the outer portion of the packing. The outer portion 27 of the sleeve, of which the cylindrical portion 26 is a part, is formed with a number of circumferential ribs or flanges 28 which, like the ribs or flanges 15, have relatively wide peripheral surfaces and inclined side walls when viewed in section as in Fig. 1. The portion 27 of the sleeve member on which the flanges 28 are formed is mounted within a lining having internal grooves receiving the flanges 15, said lining comprising a pair of members 29 abutting along one edge thereof and spaced apart at their opposite edges, like the members 16 above described, and leaving a space into which a quantity of felt 30 or other appropriate material is packed and compressed. As in the case of the packing material 17, the packing material 30 serves as a capillary conductor or conveyor for lubricant to conduct or convey lubricant between the sleeve portion 27 and the lining and into appropriately formed lubricant receiving grooves 31 at the bases and on the thrust sides of the flanges 28. In addition, the packing 30 acts as a wiper to lubricate the thrust collar at the end of the sleeve 26—27. Lubricant may be delivered to the lubricant conveyor 30 through a passage 32 similar to the passage 23 shown in section in Fig. 2 through which lubricant is delivered to the packing lubricant conveyor 17.

The lining comprising two members 29 has thrust engagement with a shoulder 33 in the support 34 in which the lining is mounted. A thrust collar is provided at the end of the sleeve 26—27, the same comprising a collar 35 having a circumferential flange or shoulder 36 bearing against a similar shoulder in the member 34. In addition to serving as a thrust member for the lining the collar 35 serves as a seal, the bearing surface of which is lubricated by lubricant delivered from the lubricant conveyor 30. This collar is pressed into the member 34.

A packing seal is mounted between the sleeve 7 and the sleeve 26—27. As shown, the packing seal is enclosed within the cylindrical portion 26 of the sleeve and comprises a quantity of Garlock or other appropriate packing material 37. A gland 38 pressed within the cylindrical portion 8 by the sleeve 7 compresses the packing 37 as required to form a perfect seal, even under conditions of high pressure.

The extended portion of the shaft 3 beyond the bearing may be connected with the driving mechanism.

From the foregoing it is apparent that my invention serves all of its purposes and accomplishes all of its objects in a highly efficient manner and to a maximum degree.

The parts being properly constructed may be assembled without the necessity of adjustment. The parts are intended to be made to fit so that when assembled in abutting contact in the manner described need for optional adjustment or variation of the parts is entirely eliminated. Friction is minimized and leakage through the packing is impossible, even under high pressure.

The packing may be applied to various uses and the construction thereof may be varied within equivalent limits without departure from the nature and principle of the invention as set forth in the appended claims.

What I claim and desire to secure by Letters Patent, is:—

1. A packing, comprising a longitudinally divided lining having a plurality of internal thrust-bearing surfaces, in combination with a revoluble tubular member having greater length than the length of the lining journaled in the lining and engaging said surfaces, a circumferential shoulder on said member, and an abutment encircling said member at one end of said lining preventing axial movement of the lining and engaging said shoulder and forming a seal across the line of separation of the lining and the revoluble member.

2. A packing, comprising a lining having a plurality of thrust bearing surfaces, in combination with a revoluble member journaled in the lining and engaging said surfaces, a circumferential shoulder on said member, means for conducting a lubricant to said bearing surfaces, and an abutment engaging the end of said lining and also engaging said shoulder.

3. A packing, comprising a revoluble shaft, a sleeve secured on said shaft and having a plurality of thrust bearing surfaces, an abutment preventing axial movement of said sleeve and said shaft, a bearing lining in which said sleeve is journaled engaging said thrust bearing surfaces, and a seal at the end of said lining.

4. A packing, comprising a revoluble shaft, a sleeve secured on said shaft and having a plurality of thrust bearing surfaces, an abutment preventing axial movement of said sleeve and said shaft, a bearing lining in which said sleeve is journaled engaging said thrust bearing surfaces, a seal at the end of said lining, and means for conducting a lubricant to said abutment and to said thrust bearing surfaces.

5. The combination with a rotary shaft, of a packing comprising a sleeve secured to said shaft, packing material forming a seal adjacent to the inner end of said sleeve, a plurality of thrust bearing surfaces on said sleeve, an abutment preventing axial movement of said sleeve, and a bearing lining in which said sleeve is mounted engaging said thrust bearing surfaces on said sleeve.

6. The combination with a rotary shaft, of a packing comprising a sleeve secured to said shaft, packing material forming a seal adjacent to the inner end of said sleeve, a plurality of thrust bearing surfaces on said sleeve, an abutment preventing axial movement of said sleeve, a bearing lining in which said sleeve is mounted engaging said thrust bearing surfaces on said sleeve, passages for delivering lubricant to said thrust bearing surfaces, and means for conducting lubricant to said passages.

7. The combination with a rotary shaft, and bearings in which said shaft is journaled for rotation, of a metallic packing located between said bearings comprising a sleeve secured upon the shaft, thrust bearing surfaces on the sleeve, a circumferential shoulder on said sleeve, a lining in which said sleeve is mounted for rotation, thrust bearing surfaces in the lining engaging the thrust bearing surfaces on the sleeve, an abutment engaging said shoulder and also engaging said lining to hold them from axial movement, a seal at the inner end of the sleeve forming a seal between the sleeve and the shaft, and a device holding said seal in position.

8. The combination with a rotary shaft, and bearings in which said shaft is journaled for rotation, of a metallic packing comprising a sleeve secured upon the shaft, thrust bearing surfaces on the sleeve, an abutment for said sleeve, a lining in which said sleeve is mounted for rotation, thrust bearing surfaces in the lining engaging the thrust bearing surfaces on the sleeve, a seal at the inner end of the sleeve forming a seal between the sleeve and the shaft, a nut threaded on said sleeve holding said seal in position, and a device preventing said nut from turning relative to the shaft.

9. The combination with a revoluble shaft, and spaced bearings in which said shaft is journaled for rotation, of a packing on said shaft between said bearings comprising a sleeve enclosing the shaft, a device at the inner end of the sleeve forming a seal between the sleeve and the shaft, means for holding said seal in position and preventing the shaft from turning relative to the sleeve, a number of thrust bearing surfaces on the sleeve, a lining enclosing the sleeve, and an abutment for the sleeve at the outer end of the lining forming a seal at the end of the lining.

10. The combination with a revoluble shaft, and spaced bearings in which said shaft is journaled for rotation, of a packing on said shaft between said bearings comprising a sleeve enclosing the shaft, a device at the inner end of the sleeve forming a seal between the sleeve and the shaft, means for holding said seal in position and preventing the shaft from turning relative to the sleeve, a number of thrust bearing surfaces on the sleeve, a lining enclosing the sleeve, an abutment for the sleeve at the outer end of the lining forming a seal at the end of the lining, and means for conducting a lubricant to said bearing surfaces and to said abutment.

11. The combination with a rotary shaft, and a number of spaced bearings in which said shaft is journaled for rotation, of a packing on said shaft between said bearings, comprising a sleeve encircling the shaft, a number of thrust bearing surfaces on the sleeve, a lining enclosing the sleeve, thrust bearing surfaces on the lining engaging the thrust bearing surfaces on the sleeve, an abutment for said sleeve forming a seal at the outer end of the lining, an additional sleeve having threaded engagement with the first-named sleeve, a number of thrust bearing surfaces on said additional sleeve, and a lining having thrust bearing surfaces contacting with said thrust bearing surfaces on said additional sleeve.

12. The combination with a rotary shaft, and a number of spaced bearings in which said shaft is journaled for rotation, of a packing on said shaft between said bearings, comprising a sleeve encircling the shaft, a number of thrust bearing surfaces on the sleeve, a lining enclosing the sleeve, thrust bearing surfaces on the lining engaging the thrust bearing surfaces on the sleeve, an abutment for said sleeve forming a seal at the outer end of the lining, an additional sleeve having threaded engagement with the first-named sleeve, a seal compressed between the outer end of the first-named sleeve and the inner end of said additional sleeve, a number of thrust bearing surfaces on said additional sleeve, and a lining having thrust bearing surfaces contacting with said thrust bearing surfaces on said additional sleeve.

13. The combination with a rotary shaft, and a number of spaced bearings in which said shaft is journaled for rotation, of a packing on said shaft between said bearings, comprising a sleeve encircling the shaft, a number of thrust bearing surfaces on the sleeve, a lining enclosing the sleeve, thrust bearing surfaces on the lining engaging the thrust bearing surfaces on the sleeve, an abutment for said sleeve forming a seal at the outer end of the lining, an additional sleeve having threaded engagement with the first-named sleeve, a seal compressed between the outer end of the first-named sleeve and the inner end of said additional sleeve, a number of thrust bearing surfaces on said additional sleeve, a lining having thrust bearing surfaces contacting with said thrust bearing surfaces on said additional sleeve, and a thrust collar on said shaft at the outer end of said additional sleeve.

14. The combination with a rotary shaft, and spaced bearings in which said shaft is journaled for rotation, of a packing on said shaft between said bearings comprising a sleeve encircling the shaft, packing enclosed within the inner end of said sleeve forming a seal between the sleeve and the shaft, a nut binding said packing in position, a device for holding said nut and said shaft from relative rotation, a plurality of thrust bearing surfaces on said sleeve, lubricant passages at the bases of said thrust bearing surfaces, a lining in which said sleeve is journaled, thrust bearing surfaces on said lining engaging the thrust bearing surfaces on the sleeve, an abutment for said sleeve forming a seal at the outer end of the lining, and means for conducting a lubricant into said passages.

15. The combination with a rotary shaft, and spaced bearings in which said shaft is journaled for rotation, of a packing on said shaft between said bearings comprising a sleeve encircling the shaft, packing enclosed within the inner end of said sleeve forming a seal between the sleeve and the shaft, a nut binding said packing in position, a device for holding said nut and said shaft from relative rotation, a plurality of thrust bearing surfaces on said sleeve, a lining in which said sleeve is journaled, thrust bearing surfaces on said lining engaging the thrust bearing surfaces on the sleeve, and an abutment for said sleeve forming a seal at the outer end of the lining.

16. The combination with a rotary shaft, and spaced bearings in which said shaft is journaled for rotation, of a packing on said shaft between said bearings comprising a sleeve encircling the shaft, packing enclosed within the inner end of said sleeve forming a seal between the sleeve and the shaft, a nut binding said packing in position, a device for holding said nut and said shaft from relative rotation, a plurality of thrust bearing surfaces on said sleeve, lubricant passages at the bases of said thrust bearing surfaces, a lining in which said sleeve is journaled, thrust bearing surfaces on said lining engaging the thrust bearing surfaces on the sleeve, an abutment for said sleeve forming a seal at the outer end of the lining, means for conducting a lubricant into said passages, an additional sleeve on said shaft in connection with the first-named sleeve, packing compressed between said sleeves forming a seal between the second-named sleeve and the shaft, a number of thrust bearing surfaces on said additional sleeve, a lining in which said additional sleeve is journaled, thrust bearing surfaces on said last-named lining engaging the thrust bearing surfaces on said additional sleeve, an abutment for said last-named lining, and a thrust collar at the outer end of said additional sleeve.

17. The combination with a rotary shaft, and spaced bearings in which said shaft is journaled for rotation, of a packing on said shaft between said bearings comprising a sleeve encircling the shaft, packing enclosed within the inner end of said sleeve forming a seal between the sleeve and the shaft, a nut binding said packing in position, a device for holding said nut and said shaft from relative rotation, a plurality of thrust bearing surfaces on said sleeve, lubricant passages at the bases of said thrust bearing surfaces, a lining in which said sleeve is journaled, thrust bearing surfaces on said lining engaging the thrust bearing surfaces on the sleeve, an abutment for said sleeve forming a seal at the outer end of the lining, means for conducting a lubricant into said passages, an additional sleeve on said shaft in connection with the first-named sleeve, packing compressed between said sleeves forming a seal between the second-named sleeve and the shaft, a number of thrust bearing surfaces on said additional sleeve, a lining in which said additional sleeve is journaled, thrust bearing surfaces on said last-named lining engaging the thrust bearing surfaces on said additional sleeve, an abutment for said last-named lining, a thrust collar at the outer end of said additional sleeve, and means for lubricating the thrust bearing surfaces on said additional sleeve and said second-named lining.

EDWARD WILSON.